United States Patent
Rao et al.

(10) Patent No.: US 12,169,699 B2
(45) Date of Patent: *Dec. 17, 2024

(54) MACHINE-LEARNING-BASED TECHNIQUES FOR PREDICTIVE MONITORING OF A SOFTWARE APPLICATION FRAMEWORK

(71) Applicants: ATLASSIAN PTY LTD., Sydney (AU); ATLASSIAN US, INC., San Francisco, CA (US)

(72) Inventors: Shashank Prasad Rao, Bengaluru (IN); Karthik Muralidharan, Bengaluru (IN)

(73) Assignees: Atlassian PTY Ltd, Sydney (AU); Atlassian US, Inc., San Francisco, CA (US)

( * ) Notice: Subject to any disclaimer, the term of this patent is extended or adjusted under 35 U.S.C. 154(b) by 625 days.

This patent is subject to a terminal disclaimer.

(21) Appl. No.: 17/127,216

(22) Filed: Dec. 18, 2020

(65) Prior Publication Data

US 2022/0198156 A1 Jun. 23, 2022

(51) Int. Cl.
*G06F 40/58* (2020.01)
*G06F 11/30* (2006.01)
*G06F 11/34* (2006.01)
*G06N 20/00* (2019.01)

(52) U.S. Cl.
CPC ............ *G06F 40/58* (2020.01); *G06F 11/302* (2013.01); *G06F 11/3495* (2013.01); *G06N 20/00* (2019.01)

(58) Field of Classification Search
CPC .... G06F 11/302; G06F 11/3495; G06F 40/58; G06N 20/00

USPC .................................................. 717/127–128
See application file for complete search history.

(56) References Cited

U.S. PATENT DOCUMENTS

| | | | | |
|---|---|---|---|---|
| 11,704,188 | B2 * | 7/2023 | Gupta | ..................... H04L 41/22 |
| | | | | 714/37 |
| 11,726,889 | B1 * | 8/2023 | Rao | ......................... G06N 3/045 |
| | | | | 709/224 |
| 11,924,064 | B2 * | 3/2024 | Mann | .................. H04L 41/5012 |
| 2019/0164104 | A1 * | 5/2019 | Gupta | ..................... G06Q 50/12 |
| 2019/0165966 | A1 * | 5/2019 | Gupta | ..................... G06Q 10/06 |
| 2019/0205667 | A1 * | 7/2019 | Avidan | .................. G08G 1/165 |

(Continued)

OTHER PUBLICATIONS

Apparatuses, Computer-Implemented Methods, and Computer Program Products For Improved Data Event Root Cause Identification And Remediation, U.S. Appl. No. 17/644,988.

(Continued)

*Primary Examiner* — Ted T. Vo
(74) *Attorney, Agent, or Firm* — Alston & Bird LLP

(57) ABSTRACT

Systems and methods provide techniques for more effective and efficient predictive monitoring of a software application framework. In response, embodiments of the present invention provide methods, apparatuses, systems, computing devices, and/or the like that are configured to enable effective and efficient predictive monitoring of a software application framework using incident signatures for the software application that are generated by using a natural language processing machine learning framework, a structured data processing machine learning model, a feature combination machine learning model, and a clustering machine learning model.

20 Claims, 10 Drawing Sheets

(56) References Cited

U.S. PATENT DOCUMENTS

| | | | | |
|---|---|---|---|---|
| 2020/0184355 A1* | 6/2020 | Mehta | ............... | G06F 11/008 |
| 2020/0210149 A1* | 7/2020 | Caldwell | ............ | G06F 11/3604 |
| 2020/0242483 A1* | 7/2020 | Shashikant Rao | ...... | G06N 5/01 |
| 2020/0400214 A1* | 12/2020 | Morikawa | ............. | F16G 13/04 |
| 2021/0034712 A1* | 2/2021 | Dasgupta | ............... | G06F 30/20 |
| 2021/0150259 A1* | 5/2021 | Dasgupta | ............... | G06N 3/082 |
| 2021/0191802 A1* | 6/2021 | Hunter | ............... | G06F 11/0793 |
| 2023/0004835 A1* | 1/2023 | Sawhney | ............... | H04L 41/16 |
| 2023/0094373 A1* | 3/2023 | Muralidharan | ...... | G06F 11/327 |
| | | | | 714/38.1 |
| 2023/0305944 A1* | 9/2023 | Biswas | ............. | G06F 11/3612 |

OTHER PUBLICATIONS

Apparatuses, Methods, and Computer Program Products For Predictive Determinations of Causal Change Identification For Service Incidents, U.S. Appl. No. 17/559,563.

Machine-Learning-Based Techniques For Determining Response Team Predictions For Incident Alerts in a Complex Platform, U.S. Appl. No. 17/454,838.

Machine-Learning-Based Techniques For Predictive Monitoring of a Software Application Framework, U.S. Appl. No. 17/657,237.

Methods, Apparatuses and Computer Program Products For Generating Responder Alert Data Objects Based on Global Alert Policy Data Objects and Inline Alert Policy Data Objects, U.S. Appl. No. 16/448,615.

Methods, Apparatuses and Computer Program Products For Generating Service health Status Data Objects and Rendering Health Status Monitoring User Interfaces, U.S. Appl. No. 17/656,529.

Predictive Monitoring Of Software Application Frameworks Using Machine-Learning-Based Techniques, U.S. Appl. No. 17/486,293.

* cited by examiner

601
ALL | OPEN | CLOSED | UNACK'ED | NOT SEEN | ☐ OWNED BY ME
☐ MY ALERTS

[NEW ALERT] [ACK ALL] [CLOSE ALL]

☐ [ACK] [OWN] [ASSIGN] [ADD TEAM]     [ADD FILTER +]
[ADD RECIPIENT] [SNOOZE] [CLOSE] [DELETE]

611 — ☐ 1246  APR 29, 2016 8:08 AM    APPLICATION PROBLEM 979: WEB CHECK GLOBAL OUTAGE    OWNER: NO OWNER  TEAMS:  RECIPIENTS:    [OPEN ▶] [UNACK'ED]

612 — ☐ 1159  APR 16, 2016 4:30 PM    OPEN PROBLEM 646: PROCESS CRASHED    OWNER: NO OWNER  TEAMS:  RECIPIENTS:    [OPEN ▶] [UNACK'ED]

613 — ☐ 1051  APR 15, 2016 10:03 PM    OPEN PROBLEM 534: PROCESS CRASHED    OWNER: NO OWNER  TEAMS:  RECIPIENTS:    [OPEN ▶] [UNACK'ED]

614 — ☐ 852  APR 14, 2016 1:54 PM    OPEN PROBLEM 186: CPU SATURATION    OWNER: NO OWNER  TEAMS:  RECIPIENTS:    [OPEN ▶] [UNACK'ED]

615 — ☐ 813  APR 14, 2016 7:42 PM    OPEN PROBLEM 814: PROCESS CRASHED    OWNER: NO OWNER  TEAMS:  RECIPIENTS:    [OPEN ▶] [UNACK'ED]

```
[
  ...,
  {
    "name": "0", //alert group label
    "alerts": [
      {
        711 "acknowledged": false,
        712 "isSeen": false,
        713 "count": 1,
        714 "priority": "P2",
        715 "message": "[prod-ops-us-west-2] JavaScript TypeError: t is not a function",
        716 "id": "d9bc4393-c7f1-4a1e-9615-5e99c9efc6ae-1597738815815",
        717 "owner": "",
        718 "teams": "morpheus-ops",
        719 "alias": "[prod-ops-us-west-2] OpsGenie Web_TypeError_/service/list_t is not a function",
        720 "createdAt": "2020-08-18 13:50:15.815000",
        721 "updatedAt": "2020-08-18 13:50:15:945000",
        722 "status": "open",
        723 "lastOccurredAt": null,
        724 "snoozedUntil": null,
        725 "snoozed": false
      },
      ...
    ]
  }
```

701 brackets items 711–725

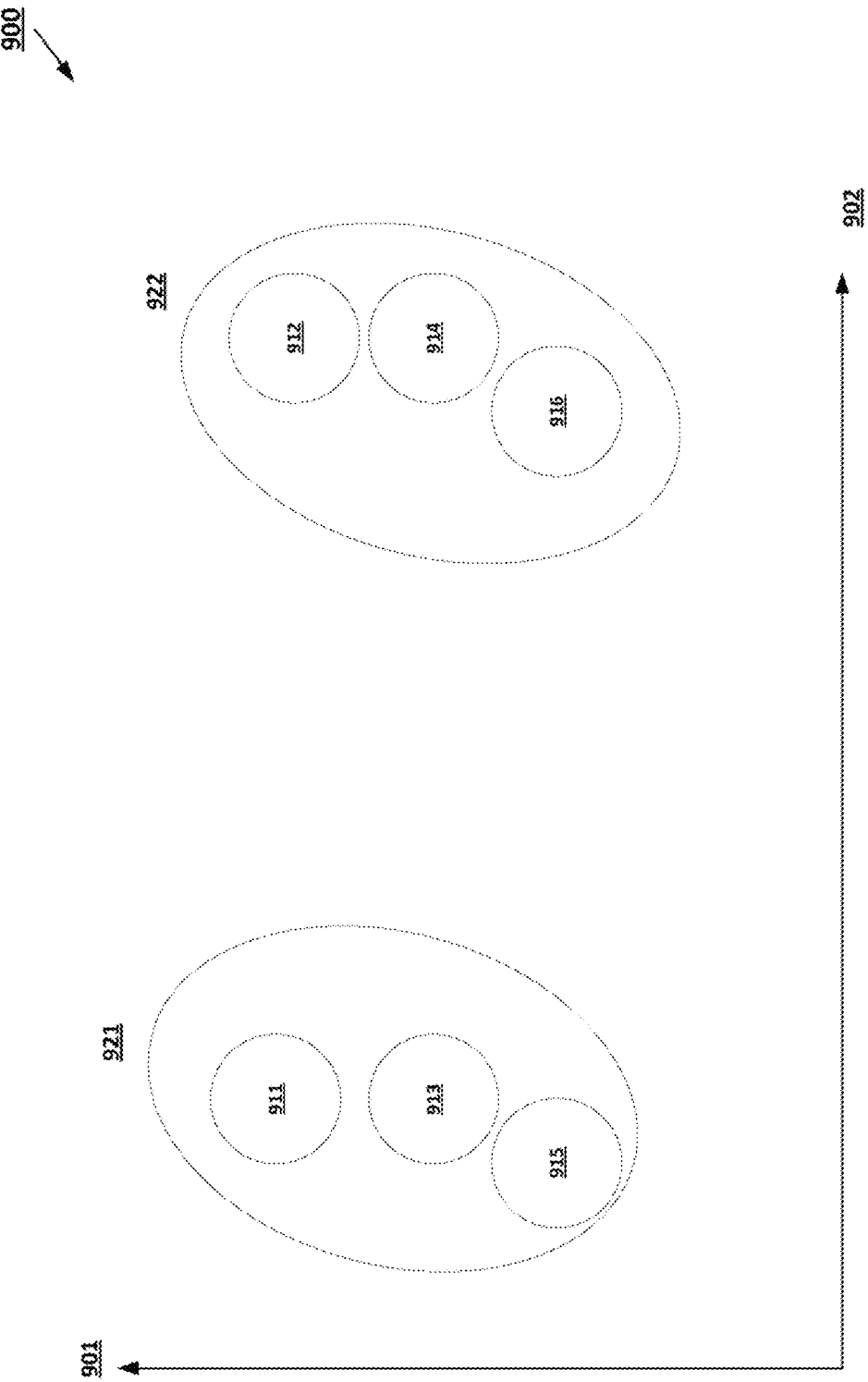

FIG. 10

```
                                    1000
MESSAGE: ALARM: "CLOUDFRONT GLOBAL ERROR RATE RESTAPI
DISTRIBUTION4xxERRORRATE I..." IN US EAST (N. VIRGINIA)
ALIAS: US EAST (N. VIRGINIA) - CLOUDFRONT GLOBAL ERROR RATE
RESTAPI DISTRIBUTION4xxERRORRATE IS HIGH
TIMESTAMP: 18 AUG 2020, 01:38:02
SEEN: NOPE
ACKNOWLEDGED: NOPE
PRIORITY: P3
```

NAME: 3
FIRST ALERT

JANEDOE@ATLASSIAN.COM
LAST ALERT

1002

REMOVE

ALIAS: [EU-OPS-EU-CENTRAL-1] ARN:AWS:STS::401089113854:ASSUMED-ROLE/OPSGENIE-EU-ADMINISTRATORACCESS/JANEDOE@ATLASSIAN.COM_DELETEQUEUE_SQS.AMAZONAWS.COM
TIMESTAMP: 18 AUG 2020, 01:56:31
MESSAGE: [EU-OPS-EU-CENTRAL-1] SUSPICIOUS OPERATIONDELETEQUEUE OCCURRED AT SERVICESQS.AMAZONAWS.COM BY JANEDOE@ATLASSIAN.COM
SEEN: NOPE
ACKNOWLEDGED: NOPE
PRIORITY: P1

1011
DELETE FROM CLUSTER
ADD TO DIFFERENT CLUSTER

ALIAS: US EAST (N. VIRGINIA) - CLOUDFRONT GLOBAL ERROR RATE DISTRIBUTION4xxERRORRATE IS HIGH
TIMESTAMP: 18 AUG 2020, 01:38:02
MESSAGE: ALARM: "CLOUDFRONT GLOBAL -ERROR RATE RESTAPI DISTRIBUTION4xxERRORRATE I..." IN US EAST (N. VIRGINIA)
SEEN: NOPE
ACKNOWLEDGED: NOPE
PRIORITY: P3

ALIAS: US WEST (OREGON) - US-WEST-2 BUSINESS-REPORTING-DYNAMO-STREAM-TO-STREAM-HUB-LISTENER LAMBDA PRODUCES TOO MUCH LOGS
TIMESTAMP: 18 AUG 2020, 01:34:46
MESSAGE: ALARM: "US-WEST-2 BUSINESS-REPORTING-DYNAMO-STREAM-TO-STREAM-HUB-LISTENER LA..." IN US WEST (OREGON)
SEEN: NOPE
ACKNOWLEDGED: NOPE
PRIORITY: P5

1001
5
ALERTS

1012
UNLINK CLUSTER FROM INCIDENTS

1013
LINK CLUSTER TO INCIDENTS

1014
DELETE CLUSTER

ALIAS: US WEST (OREGON) - DEPLOY-US-WEST-2_CPU_TOOHIGH
TIMESTAMP: 18 AUG 2020, 01:33:05
MESSAGE: ALARM "DEPLOY-US-WEST-2_CPU_TOOHIGH" IN US WEST (OREGON)
SEEN: NOPE
ACKNOWLEDGED: NOPE
PRIORITY: P1

ALIAS: US WEST (OREGON) - SQS QUEUE SRE-SERVER-LOGS-S3-EVENTS-FOR-SPLUNK-MESSAGECOUNT TOO HIGH
TIMESTAMP: 18 AUG 2020, 01:31:07
MESSAGE: ALARM: "SQS QUEUE SRE-SERVER-LOGS-S3-EVENTS-FOR-SPLUNK MESSAGECOUNT TOO HIGH" IN US WEST (OREGON)
SEEN: NOPE
ACKNOWLEDGED: NOPE
PRIORITY: P3

MACHINE-LEARNING-BASED TECHNIQUES FOR PREDICTIVE MONITORING OF A SOFTWARE APPLICATION FRAMEWORK

BACKGROUND

Various methods, apparatuses, and systems are configured to provide techniques for monitoring software application frameworks. Applicant has identified many deficiencies and problems associated with existing methods, apparatuses, and systems for monitoring software application frameworks. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient monitoring of software application frameworks. For example, certain embodiments of the present invention provide methods, apparatuses, systems, computing devices, and/or the like that are configured to perform software application framework monitoring using incident signatures for the software applications that are generated by using a natural language processing machine learning framework, a structured data processing machine learning model, a feature combination machine learning model, and a clustering machine learning model.

In accordance with one aspect, a computer-implemented method is provided. In one embodiment, the computer-implemented method comprises: determining, based on one or more natural language data fields of a software monitoring data object for the software application framework and using a natural language processing machine learning framework, a natural language feature data object for the software incident data object; determining, based on one or more structured data fields of the software monitoring data object and using a structured data processing machine learning model, a structured data feature data object for the software monitoring data object; determining, based on the natural language feature data object and the structured data feature data object and using a feature combination machine learning model, a monitoring data representation for the software monitoring data object; determining, based on the monitoring data representation and using a clustering machine learning model, one or more predicted monitoring data clusters for the software monitoring data object; determining, based on the one or more predicted monitoring data clusters, one or more incident signatures for the software application framework; performing one or more prediction-based actions based on the one or more incident signatures.

In accordance with another aspect, a computer program product is provided. The computer program product may comprise at least one computer-readable storage medium having computer-readable program code portions stored therein, the computer-readable program code portions comprising executable portions configured to: determine, based on one or more natural language data fields of a software monitoring data object for the software application framework and using a natural language processing machine learning framework, a natural language feature data object for the software incident data object; determine, based on one or more structured data fields of the software monitoring data object and using a structured data processing machine learning model, a structured data feature data object for the software monitoring data object; determine, based on the natural language feature data object and the structured data feature data object and using a feature combination machine learning model, a monitoring data representation for the software monitoring data object; determine, based on the monitoring data representation and using a clustering machine learning model, one or more predicted monitoring data clusters for the software monitoring data object; determine, based on the one or more predicted monitoring data clusters, one or more incident signatures for the software application framework; perform one or more prediction-based actions based on the one or more incident signatures.

In accordance with yet another aspect, an apparatus comprising at least one processor and at least one memory including computer program code is provided. In one embodiment, the at least one memory and the computer program code may be configured to, with the processor, cause the apparatus to: determine, based on one or more natural language data fields of a software monitoring data object for the software application framework and using a natural language processing machine learning framework, a natural language feature data object for the software incident data object; determine, based on one or more structured data fields of the software monitoring data object and using a structured data processing machine learning model, a structured data feature data object for the software monitoring data object; determine, based on the natural language feature data object and the structured data feature data object and using a feature combination machine learning model, a monitoring data representation for the software monitoring data object; determine, based on the monitoring data representation and using a clustering machine learning model, one or more predicted monitoring data clusters for the software monitoring data object; determine, based on the one or more predicted monitoring data clusters, one or more incident signatures for the software application framework; perform one or more prediction-based actions based on the one or more incident signatures.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 6 provides an operational example of a software monitoring data display user interface in accordance with at least some embodiments of the present invention.

FIG. 7 provides an operational example of an incident signature in accordance with at least some embodiments of the present invention.

Figure 8:
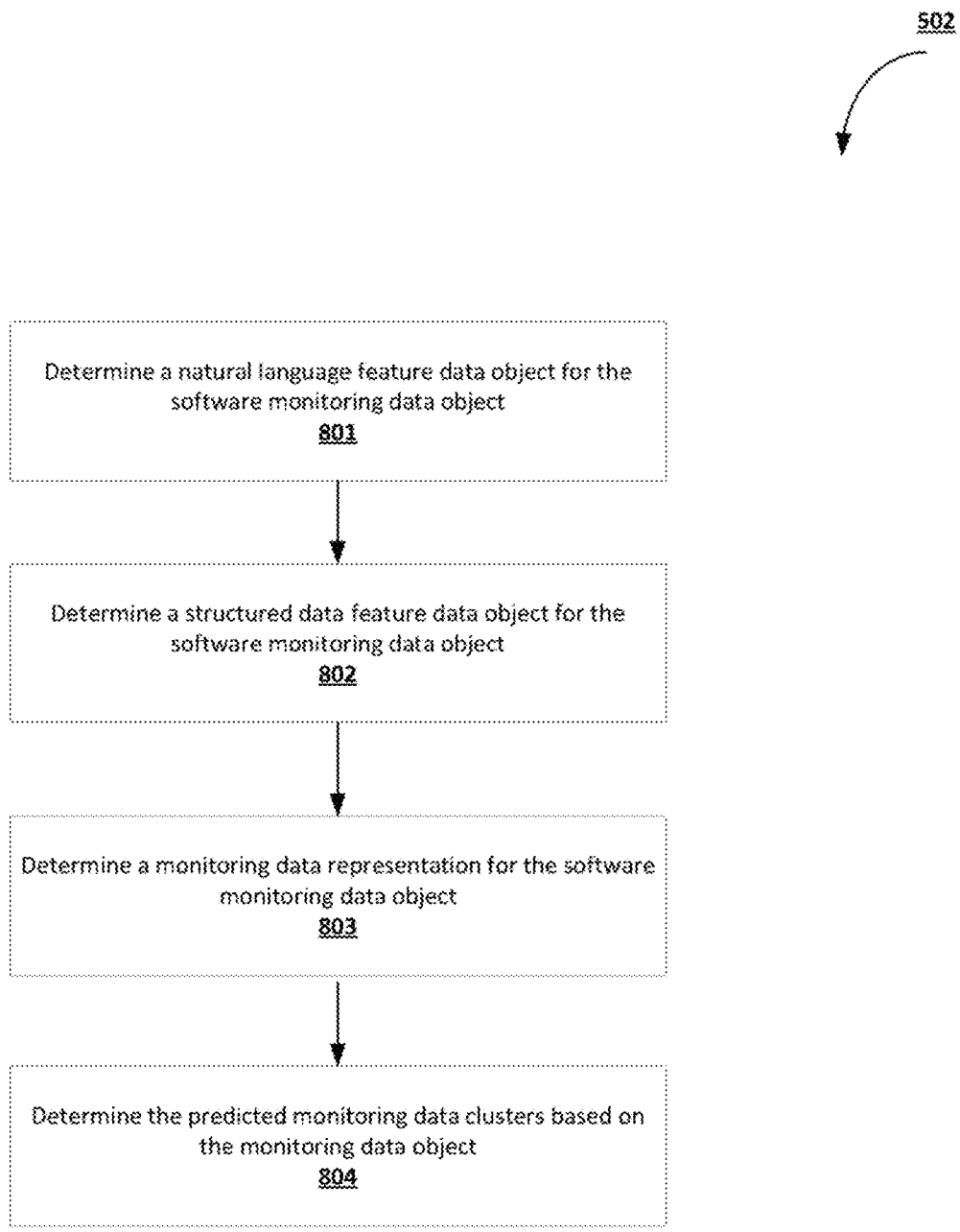

FIG. 8 is a flowchart diagram of an example process for determining predicted monitoring data clusters for a software monitoring data object in accordance with at least some embodiments of the present invention.

FIG. 9 provides an operational example of a multi-dimensional space used to generate predicted monitoring data clusters in accordance with at least some embodiments of the present invention.

FIG. 10 provides an operational example of a prediction output user interface in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably performing predictive monitoring of complex software application frameworks. The disclosed techniques can be utilized by a software monitoring data management system to generate predictive insights that enhance effectiveness and efficiency of performing software application framework monitoring with respect to complex software application frameworks. An example of such a software monitoring data management system is the Opsgenie® incident management system provided by Atlassian PTY LTD, which enables the collection of software monitoring data objects for various complex software application frameworks.

A complex software application framework is typically characterized by large networks of interdependent services and microservices that support a myriad of software features and applications. Indeed, some large complex software application frameworks may be comprised of topologies of 1,500 or more interdependent services and microservices. Such complex software application frameworks are nimble, highly configurable, and enable robust collaboration and communication between users at the individual, team, and enterprise level.

Complex software application frameworks typically include large numbers of software applications. Each software application includes a number of features, with many features (e.g., user authentication features) shared between multiple software applications. Other features are supported only by one associated software application or a defined subset of software applications.

A given complex software application framework could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

Individual software applications or software services may be configured to generate software monitoring data objects (e.g., software incident alerts) that describe a maintenance-critical state of the software applications or software services. Because of the numerosity of the software applications/services that are hosted by a complex software application framework, a large number of software monitoring data objects may be generated at any selected time interval. In some circumstances, a subset of the noted software monitoring data objects may collectively relate to a common maintenance-critical property of the complex software application framework.

For example, consider a scenario in which a first software application of a complex software application framework that is configured to perform database retrieval experiences a failure. In this scenario, in addition to the first software application, each of the frontend software applications that rely on successful data retrieval operations from a target database may generate independent software monitoring data objects that describe a maintenance-critical state of those frontend software applications. These frontend-generated software monitoring data objects, while they describe valid maintenance-critical conditions, may not be independently valuable for detecting maintenance needs of the overall complex software application framework and addressing those detected maintenance needs.

As another example, consider another scenario in which a first software application of a complex software application framework that is configured to act as a networking point for a target network experiences a failure. In this scenario, in addition to the first software application, each of the software applications that rely on successful retrieval of data using the target network may generate independent software monitoring data objects that describe a maintenance-critical state of those software applications. Similar to the frontend-generated software monitoring data objects described in relation to the previous example, the downstream-generated software monitoring data objects described in relation to this example may not be independently valuable for detecting maintenance needs of the overall complex software application framework and addressing those detected maintenance needs.

As the examples above illustrate, without generating predictive insights about topical relationships between software monitoring data objects, a software monitoring data management system will be forced to assess software monitoring data objects individually, which results in the need for performing additional processing operations and using unnecessary computational resources. This problem is amplified as the number of software applications, features, or services in a complex software application framework grows larger, which in turn leads to data processing problems associated with real-time processing of a large number of software monitoring data objects.

As the foregoing description will illustrate, a software monitoring approach that relies exclusively on individual processing of software monitoring data objects generated by software applications and software application services is not scalable. It immediately becomes highly inefficient to process software monitoring data objects on an individual level as the complex software application frameworks grow and dynamically change.

To address the above-described challenges related to monitoring complex software application frameworks, various embodiments of the present invention describe techniques for generating incident signatures for a complex software application framework that are determined based on clusters of software monitoring data objects associated with a software application or a software service. The clusters are in turn generated by processing features associated with software monitoring data objects (e.g., natural language features associated with software monitoring data objects and/or structured feature data objects associated with software monitoring data objects) using various machine learning techniques in order to generate monitoring data representations of those software monitoring data objects.

By using the described techniques, various embodiments of the present invention generate predictive insights about topical relationships between software monitoring data objects that can be used to increase efficiency and effectiveness of software application and software service monitoring. In doing so, various embodiments of the present invention make substantial technical contributions to improving the efficiency and the effectiveness of monitoring complex software application frameworks.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the software monitoring data management computing device 106 of FIG. 1. In some embodiments, a server computing device communicates with one or more client computing devices using one or more computer networks.

The term "software monitoring data object" refers to a collection of data, formats, and optionally, instructions, that are generated by a software application monitoring computing device and transmitted to a software monitoring data management computing device. The software monitoring data object is configured to describe one or more execution properties associated with execution of a complex software application framework being monitored by the software application monitoring computing device during a maintenance-critical state (e.g., a software failure state) of the complex software application framework.

The software monitoring data object may include one or more natural language data fields that describe the above-noted execution properties using unstructured natural language data as well as one or more structured data fields that describe the execution properties using structured data, such as key-value pairs. Examples of software monitoring data objects include software incident alert data objects. Examples of natural language data fields of a software monitoring data object include a message data field of the software monitoring data object, such as the message field of a software monitoring data object in the Opsgenie® incident management platform. Examples of structured data fields of a software monitoring data object include a monitoring data object count for the software monitoring data object, an acknowledgement status for the software monitoring data object, a generation timestamp for the software monitoring data object, a monitoring data priority score for the software monitoring data object, and a visibility status for the software monitoring data object. In some cases, a software monitoring data object describes an incident condition associated with a complex software application framework, while in other cases a software monitoring data object describes a non-incident condition associated with a complex software application framework.

The term "natural language processing machine learning framework" refers to a data object that is maintained as part of the configuration data for a software monitoring data management computing device. The natural language processing machine learning framework describes parameters, hyper-parameters, and/or operations of a collection of machine learning models that are configured to process natural language data fields of a software monitoring data object in order to generate a natural language feature data object for the software monitoring data object.

While various embodiments of the present invention describe architectures in which the natural language processing operations of the natural language processing machine learning framework are executed locally on the software monitoring data management computing device, a person of ordinary skill in the relevant technology will recognize that, in some embodiments, the natural language processing operations of the natural language processing machine learning framework may be executed on a natural language processing server computing device that is remote from the software monitoring data management computing device. For example, in some embodiments, the operations of the natural language processing machine learning framework may cause the software monitoring data management computing device to transmit one or more application programming interface (API) calls to the natural language processing server computing device in order to cause the natural language processing server computing device to generate the natural language feature data object by performing one or more natural language processing operations on the natural language data fields of a software monitoring data object and transmit the natural language feature data object to the software monitoring data management computing device in response to the API calls. Examples of natural language processing machine learning frameworks include the Google Universal Sentence Encoder, a Bidirectional Encoder Representations from Transformers (BERT)-based model, an encoder-decoder-based natural language processing model, and/or the like.

In some embodiments, the natural language processing machine learning framework includes two or more natural language processing models, e.g., a first model that is trained to understand the relevant vocabulary of a first candidate subject matter domain (e.g., the relevant vocabulary of the software and technology industry), a second model that is trained to understand the relevant vocabulary of a second candidate subject matter domain (e.g., the relevant vocabulary of the manufacturing and procurement industry), a third model that includes the first model and the second model described above, and/or the like. In some embodiments, the natural language processing machine learning framework is associated with an ontology that maps particular software monitoring data objects to applicable natural language processing models. In some embodiments, the ontology is characterized by one or more knowledge graphs.

The term "natural language feature data object" refers to a data object that is generated by a software monitoring data management computing device through processing natural language data fields of a software monitoring data object using a natural language processing machine learning framework. In some embodiments, the natural language feature data object describes an n-dimensional vector, where the n value may be supplied as a hyper-parameter of the natural language processing machine learning framework. In some embodiments, the number and types of dimensions of the natural language feature data object is defined in accordance with a feature space, where the feature space may also characterize the number and types of dimensions of a structured data feature data object. An example of a natural language feature data object is the output of processing the message field of a software monitoring data object in the Opsgenie® incident management platform using a Google Universal Sentence Encoder model.

The term "structured data processing machine learning model" refers to a data object that is maintained as part of the configuration data for a software monitoring data management computing device. The structured data processing machine learning model describes parameters, hyper-parameters, and/or operations of a machine learning model that is configured to process structured data fields of a software monitoring data object in order to generate a structured data feature data object for the software monitoring data object. While various embodiments of the present invention describe architectures in which the structured data processing operations of the structured data processing machine learning model are executed locally on the software monitoring data management computing device, a person of ordinary skill in the relevant technology will recognize that, in some embodiments, the structured data processing operations of the structured data processing machine learning model may be executed on a structured data processing server computing device that is remote from the software monitoring data management computing device.

For example, in some embodiments, the operations of the structured data processing machine learning model may cause the software monitoring data management computing device to transmit one or more API calls to the structured data processing server computing device in order to cause the structured data processing server computing device to generate the structured data feature data object by performing one or more structured data processing operations on the structured data fields of a software monitoring data object and transmit the structured data feature data object to the software monitoring data management computing device in response to the API calls. Examples of structured data processing machine learning models include a feedforward fully-connected neural network model, a recurrent neural network model, an adversarial neural network model, and/or the like.

The term "structured data feature data object" refers to a data object that is generated by a software monitoring data management computing device through processing structured data fields of a software monitoring data object using a structured data processing machine learning model. In some embodiments, the structured data feature data object describes an n-dimensional vector, where the n value may be supplied as a hyper-parameter of the structured data processing machine learning model. In some embodiments, the number and types of dimensions of the structured data feature data object is defined in accordance with a feature space, where the feature space may also characterize the number and types of dimensions of a natural language feature data object.

An example of a structured data feature data object is the output of processing the timestamp field of a software monitoring data object in the Opsgenie® incident management platform using a feedforward fully-connected neural network model. Other examples of structured feature data objects include an integration name for a software monitoring data object (e.g., an integrationName value in the Opsgenie® incident management platform, such as an ServiceNow_Prod_Instance_Connector value in the Opsgenie® incident management platform), an integration type for the software monitoring data object (e.g., an email integration type, a database integration type, a datalog connector integration type, an application programming interface (API) integration type, and/or the like, as described by an integrationType value in the Opsgenie® incident management platform), a duplication timestamp for the software monitoring data object (e.g., the duplicationTimestamps value in Opsgenie® incident management platform, which describes the exact timestamps of any re-occurrences of each alert), one or more tags for the software monitoring data object and/or the like.

The term "feature combination machine learning model" refers to a data object that is maintained as part of the configuration data for a software monitoring data management computing device. The feature combination machine learning model describes parameters, hyper-parameters, and/or operations of a machine learning model that is configured to process the natural language feature data object for a software monitoring data object and the structured data feature data object for the software monitoring data object in order to generate an monitoring data representation for the software monitoring data object. For example, the feature combination machine learning model may be configured to process the natural language feature data object for a software monitoring data object and the structured data feature data object for the software monitoring data object based on one or more trained parameters of the feature combination machine learning model in order to generate the monitoring data representation for the software monitoring data object. As another example, when the natural language feature data object for a software monitoring data object and the structured data feature data object for the software monitoring data object are both characterized by a common dimensionality and/or by a common feature space, the operations of the feature combination machine learning model may include performing one or more binary operations on the natural language feature data object and the structured data feature data object in order to generate the monitoring data representation based on the output of the one or more binary operations.

The term "monitoring data representation" refers to a data object that is generated by a software monitoring data management computing device through processing the natural language feature data object for a software monitoring data object and the structured data feature data object for the software monitoring data object using a feature combination machine learning model. The monitoring data representation for a software monitoring data object is processed by a clustering machine learning model by mapping the monitoring data representation to a multi-dimensional space that describes mappings of one or more other monitoring data representations of one or more other software monitoring data objects. The monitoring data representation mappings described by the multi-dimensional space may then processed by the clustering machine learning model in accordance with one or more clustering algorithms in order to generate one or more monitoring data clusters for the software monitoring data object. Examples of clustering algorithms that may be utilized by the clustering machine learning model include ordering points to identify the clustering structure (OPTICS), density-based spatial clustering of applications with noise (DBSCAN), K-Nearest Neighbor, K-Means, and/or the like.

The term "predicted monitoring data cluster" refers to a data object that is generated by a software monitoring data management computing device through processing the monitoring data representation for a software monitoring data object along with one or more other monitoring data representations for one or more other software monitoring data objects using a clustering machine learning model. The clustering machine learning model is configured to generate one or more monitoring data clusters based on distance measures between pairs of monitoring data representations in a multi-dimensional space associated with the clustering machine learning model, where each monitoring data cluster includes a group of software monitoring data objects whose respective monitoring data representation mappings in the multi-dimensional space are deemed sufficiently proximate. The predicted monitoring data clusters for a particular software monitoring data object include a selected subset of the one or more monitoring data clusters determined by the clustering machine learning model, where each monitoring data cluster in the selected cluster includes the particular software monitoring data object.

The term "monitoring data object count" refers to a structured data field of a corresponding software monitoring data object that describes a count of software monitoring data objects that are deemed to be associated with a common monitored event for the corresponding software monitoring data object. In some embodiments, a software application monitoring computing device that transmits software monitoring data objects to the software monitoring data management computing device performs an initial grouping of the transmitted software monitoring data objects. In some of those embodiments, the monitoring object data count for a software monitoring data object describes a count of the software monitoring data objects that are within the initial grouping of software monitoring data objects that includes the corresponding software monitoring data object.

Accordingly, because the monitoring data object count is a data field of a corresponding software monitoring data object, the monitoring data object count is generated by a software application monitoring computing device and transmitted to a software monitoring data management computing device. For example, consider a monitored event captured by the software application monitoring computing device that is in turn associated with three software monitoring data objects. In the noted example, each of the three software monitoring data objects that are associated with the software incident alert have an monitoring data object count of three. An example of an monitoring data object count field is the count field of the software monitoring data objects in the Opsgenie® incident management platform.

The term "acknowledgement status" refers to a structured data field of a corresponding software monitoring data object that describes whether the corresponding software monitoring data object has been acknowledged by an administrator user profile. Accordingly, because the acknowledgement status is a data field of a corresponding software monitoring data object, the acknowledgement status is generated by a software application monitoring computing device and transmitted to a software monitoring data management computing device. An example of an acknowledgement status is the isAcknowledged field of the software monitoring data objects in the Opsgenie® incident management platform.

The term "view status" refers to a structured data field of a corresponding software monitoring data object that describes whether the corresponding software monitoring data object has been viewed by an administrator user profile. Accordingly, because the view status is a data field of a corresponding software monitoring data object, the view status is generated by a software application monitoring computing device and transmitted to a software monitoring data management computing device. In some embodiments, the view status for a software monitoring data object is generated based on tracking the user activity data of an administrator user profile, which may for example be performed by at least one of a software application monitoring computing device and a software monitoring data management computing device 106. An example of a view status is the isSeen field of the software monitoring data objects in the Opsgenie® incident management platform.

The term "resolution status" refers to a structured data field of a corresponding software monitoring data object that describes whether the corresponding software monitoring data object has been resolved by an administrator user profile. Accordingly, because the resolution status is a data field of a corresponding software monitoring data object, the resolution status is generated by a software application monitoring computing device and transmitted to a software monitoring data management computing device. An example of an update status is the status field of the software monitoring data objects in the Opsgenie® incident management platform.

The term "generation timestamp" refers to a structured data field of a corresponding software monitoring data object that describes when the corresponding software monitoring data object was first generated by a software application monitoring computing device. Accordingly, because the generation timestamp is a data field of a corresponding software monitoring data object, the generation timestamp is generated by a software application monitoring computing device and transmitted to a software monitoring data management computing device. An example of a generation timestamp is the CreatedAt field of the software monitoring data objects in the Opsgenie® incident management platform.

The term "update timestamp" refers to a structured data field of a corresponding software monitoring data object that describes when the corresponding software monitoring data object was last updated by a software application monitoring computing device. Accordingly, because the update timestamp is a data field of a corresponding software monitoring data object, the update timestamp is generated by a software application monitoring computing device and transmitted to a software monitoring data management computing device. In some embodiments, the software monitoring data management computing device enables a software application monitoring computing device to update the data fields of a software monitoring data object after initially transmitting the software monitoring data object. In some of the noted embodiments, the software monitoring data management computing device records the latest update timestamp for a software monitoring data object as a structured data field of the software monitoring data object. An example of an update timestamp is the UpdatedAt field of the software monitoring data objects in the Opsgenie® incident management platform. In some embodiments, the update timestamp for a software monitoring data object is dynamically updated when the software monitoring data object is updated (e.g., when a software monitoring data object is window-adjusted).

The term "monitoring data priority score" refers to a structured data field of a corresponding software monitoring data object that describes an assigned relative urgency level for the corresponding software monitoring data object. Accordingly, because the monitoring data priority score is a data field of a corresponding software monitoring data object, the alert priority score is generated by a software application monitoring computing device and transmitted to a software monitoring data management computing device. In some embodiments, a software application monitoring computing device that transmits software monitoring data objects to the software monitoring data management computing device 106 performs an initial priority scoring of the transmitted software monitoring data objects, which are then used to generate the monitoring data priority scores for the software monitoring data objects. An example of a monitoring data priority score is the priority field of the software monitoring data objects in the Opsgenie® incident management platform.

The term "window-adjusted timestamp" refers to a data object that is generated by a software monitoring data management computing device by adjusting the update timestamp of a corresponding software monitoring data object based on a statistical distribution measure of the update timestamps of the software monitoring data objects that fall within a sliding window of the corresponding software monitoring data object.

For example, in some embodiments, the software monitoring data management computing device may generate a window-adjusted timestamp for a corresponding software monitoring data object by identifying a predefined number of (e.g., five) software monitoring data objects that occur within a sliding window of the corresponding software monitoring data object (e.g., a sliding window that includes the corresponding software monitoring data object, two software monitoring data objects whose update timestamps immediately precede the update timestamp of the corresponding software monitoring data object, and two software monitoring data objects whose update timestamps immediately succeed the update timestamp of the corresponding software monitoring data object), calculating the mean of the update timestamps of the five software monitoring data objects, and generating the window-adjusted timestamp based on the calculated mean. As another example, in some embodiments, the software monitoring data management computing device may generate a window-adjusted timestamp for a corresponding software monitoring data object by identifying a predefined number of (e.g., five) software monitoring data objects that occur within a sliding window of the corresponding software monitoring data object, calculating the median of the update timestamps of the five software monitoring data objects, and generating the window-adjusted timestamp based on the calculated median.

The term "user feedback data object" refers to a data object that is generated by a client computing device and transmitted to a software monitoring data management computing device. The user feedback data objects are generated based on end-user interactions with the client computing device in relation to predicted monitoring data clusters for a software monitoring data object. For example, a user interface displayed by the client computing device may enable end-users to rate predicted monitoring data clusters for a software monitoring data object, and the user-provided ratings may then be used to determine user feedback data objects. In some embodiments, the user feedback data objects are used to retrain at least one of a natural language processing machine learning framework, a structured data processing machine learning model, and a feature combination machine learning model. Other examples of user feedback data objects include a user feedback data object that is configured to associate or link a software monitoring data object to a particular incident signature, manually associate or link incident signatures to predicted monitoring clusters, delete a software monitoring data object from a predicted monitoring cluster, delete a predicted monitoring cluster, and/or the like.

The term "incident signature" refers to a data object that is generated by a software monitoring data management computing device and describes one or more inferred properties about an inferred cross-platform failure of a software application framework, where the one or more inferred properties are determined based on a monitoring data cluster that is identified by the software monitoring data management computing device. For example, in response to a monitoring data cluster that describes a group of data retrieval failures, the software monitoring data management computing device may generate an incident signature that describes the software monitoring data objects in the monitoring data cluster and/or describes that the software application framework is experiencing a database failure. As another example, in response to a monitoring data cluster that describes a group of network transmissions failures, the software monitoring data management computing device may generate an incident signature that describes the software monitoring data objects in the monitoring data cluster and/or describes that the software application framework is experiencing a network connection failure.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
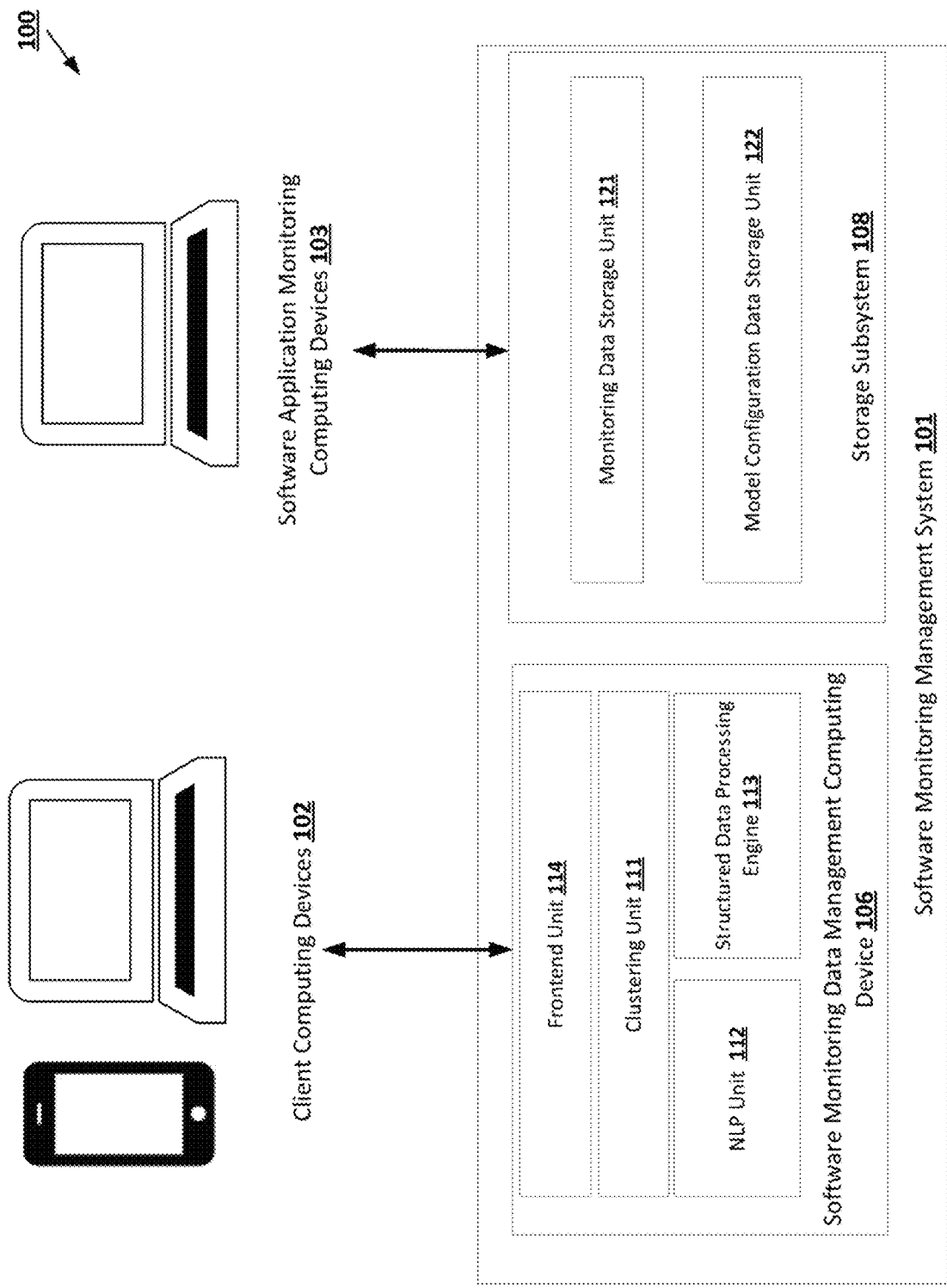
FIG. 1 is a block diagram of an example architecture within which at least some embodiments of the present invention may operate.

FIG. 1 depicts an exemplary architecture 100 for performing predictive monitoring of a software application framework that is associated with one or more software application monitoring computing devices 103. The architecture 100 includes one or more client computing devices 102, a software monitoring data management system 101, and the one or more software application monitoring computing devices 103.

The one or more software application monitoring computing devices 103 are configured to transmit software monitoring data objects to the software monitoring data management system 101, which the software monitoring data management system 101 may store in the monitoring data storage unit 121 in the storage subsystem 108 of the software monitoring data management system 101. The software monitoring data management computing device 106 may process the software monitoring data objects that are stored in the monitoring data storage unit 121 using the model configuration data that are stored in the model configuration data storage unit 122 in the storage subsystem 108 of the software monitoring data management system 101 in order to generate prediction outputs that are transmitted to the client computing devices 102 via a frontend unit 114 of the software monitoring data management computing device 106. To do so, the software monitoring data management computing device 106 may use a natural language processing unit 112, a clustering unit 111, and a structured data processing unit 113.

The natural language processing unit 112 may be configured to determine, based on one or more natural language data fields of a software monitoring data object for the software application framework and using a natural language processing machine learning framework, a natural language feature data object for the software incident data object. The structured data processing unit 113 may be configured to determine, based on one or more structured data fields of the software monitoring data object and using a structured data processing machine learning model, a structured data feature data object for the software monitoring data object. The clustering unit 111 may be configured to determine, based on the natural language feature data object and the structured data feature data object and using a feature combination machine learning model, a monitoring data representation for the software monitoring data object.

The client computing devices 102, the software application monitoring computing devices 103, and the software monitoring data management computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Software Monitoring Data Management Computing Device

Figure 2:
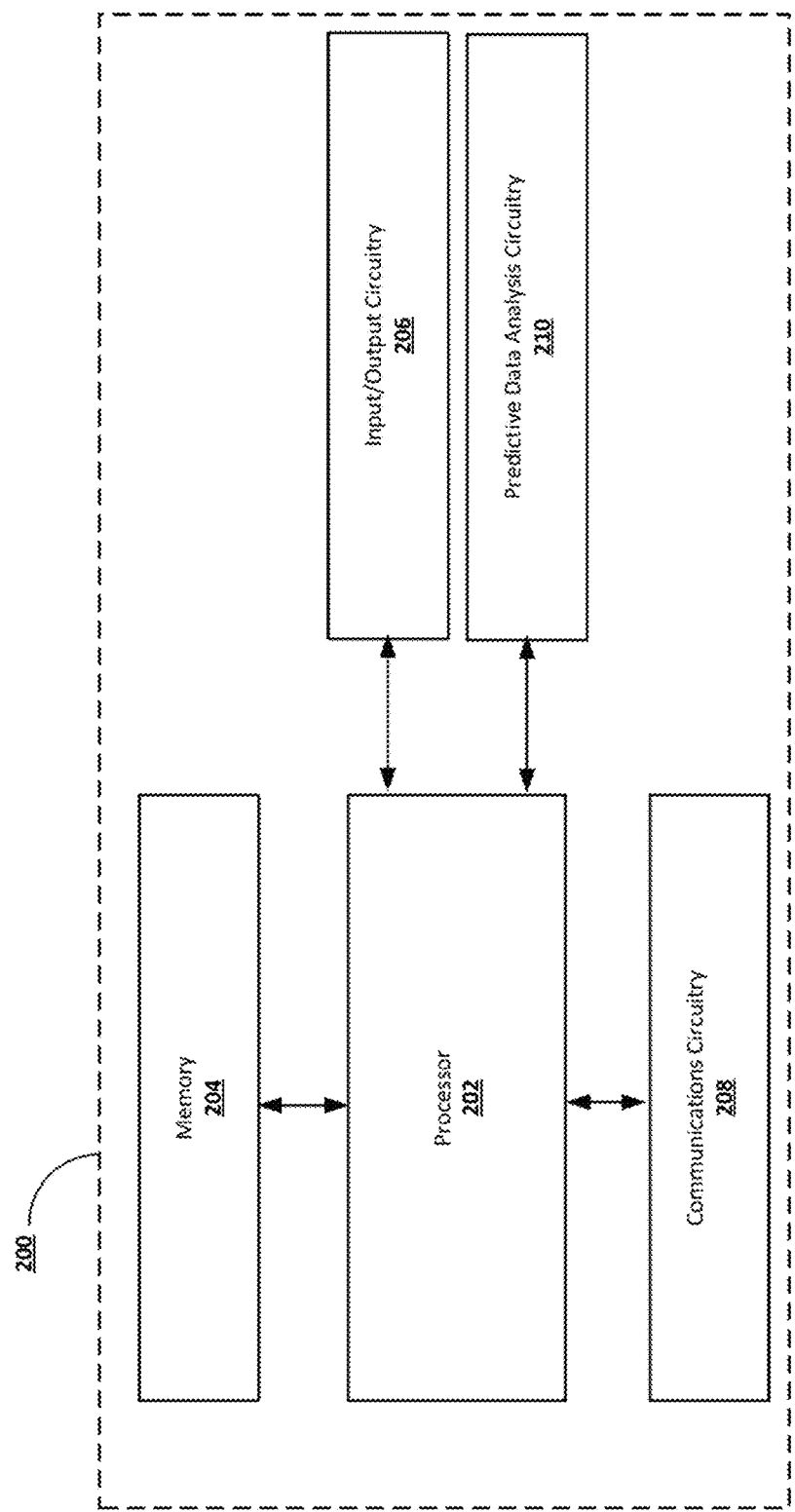
FIG. 2 is a block diagram of an example software monitoring data management computing device in accordance with at least some embodiments of the present invention.

The software monitoring data management computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or coprocessor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations. For example, the predictive data analysis circuitry 210 may include specialized circuitry that are configured to perform machine learning operations in an expedited manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
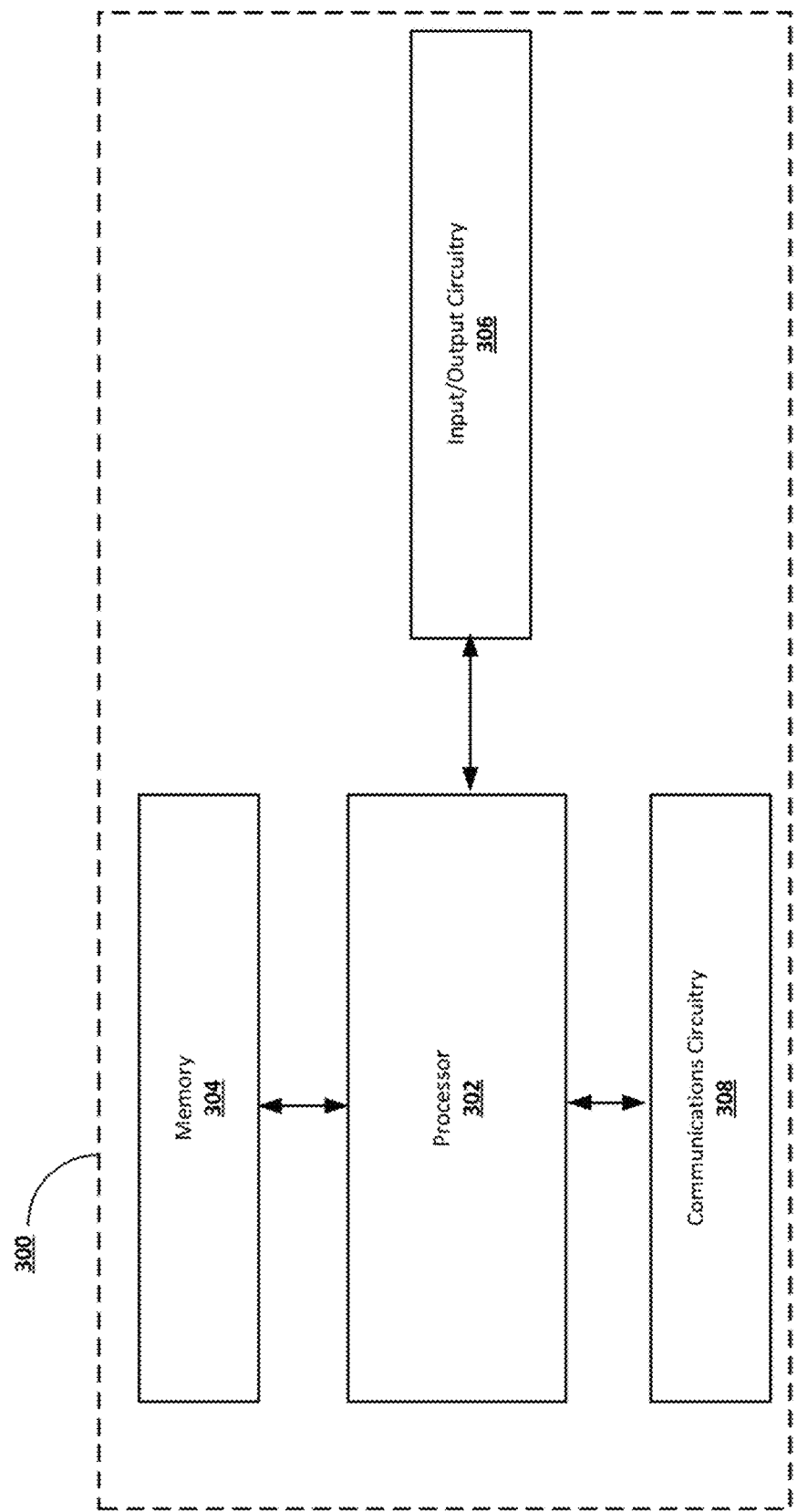
FIG. 3 is a block diagram of an example client computing device in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Software Application Monitoring Computing Device

Figure 4:
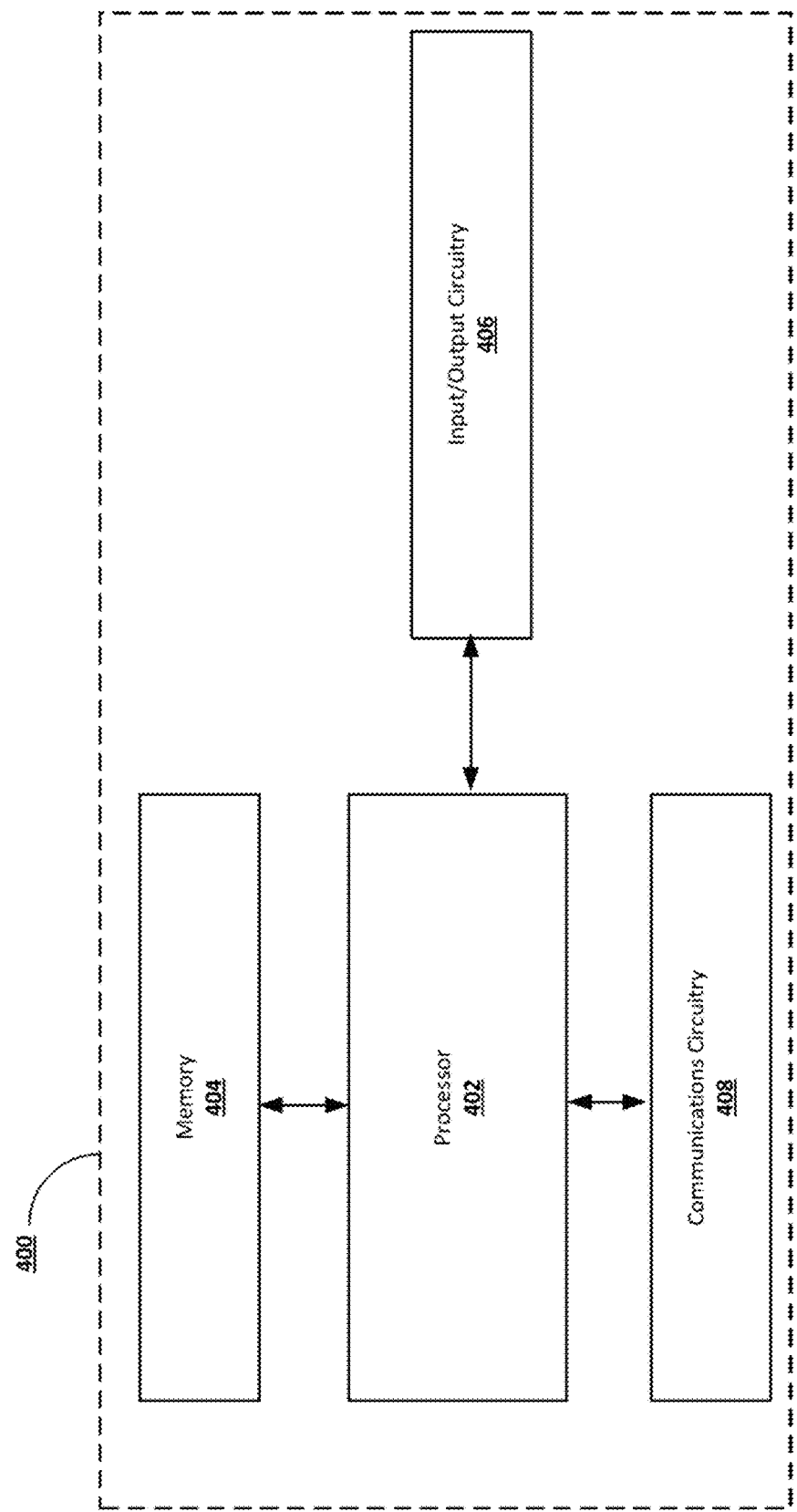
FIG. 4 is a block diagram of an example software application monitoring computing device in accordance with at least some embodiments of the present invention.

Referring now to FIG. 4, a software application monitoring computing device may be embodied by one or more computing systems, such as apparatus 400 shown in FIG. 4. The apparatus 400 may include processor 402, memory 404, input/output circuitry 406, and communications circuitry 408. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may include one or more databases. Furthermore, the memory 404 may be configured to store information, data, content, applications, instructions, or the like for enabling the apparatus 400 to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions (e.g., computer program instructions), the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like.

In embodiments in which the apparatus 400 is embodied by a limited interaction device, the input/output circuitry 406 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 406 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Example Data Flows and Operations

Figure 5:
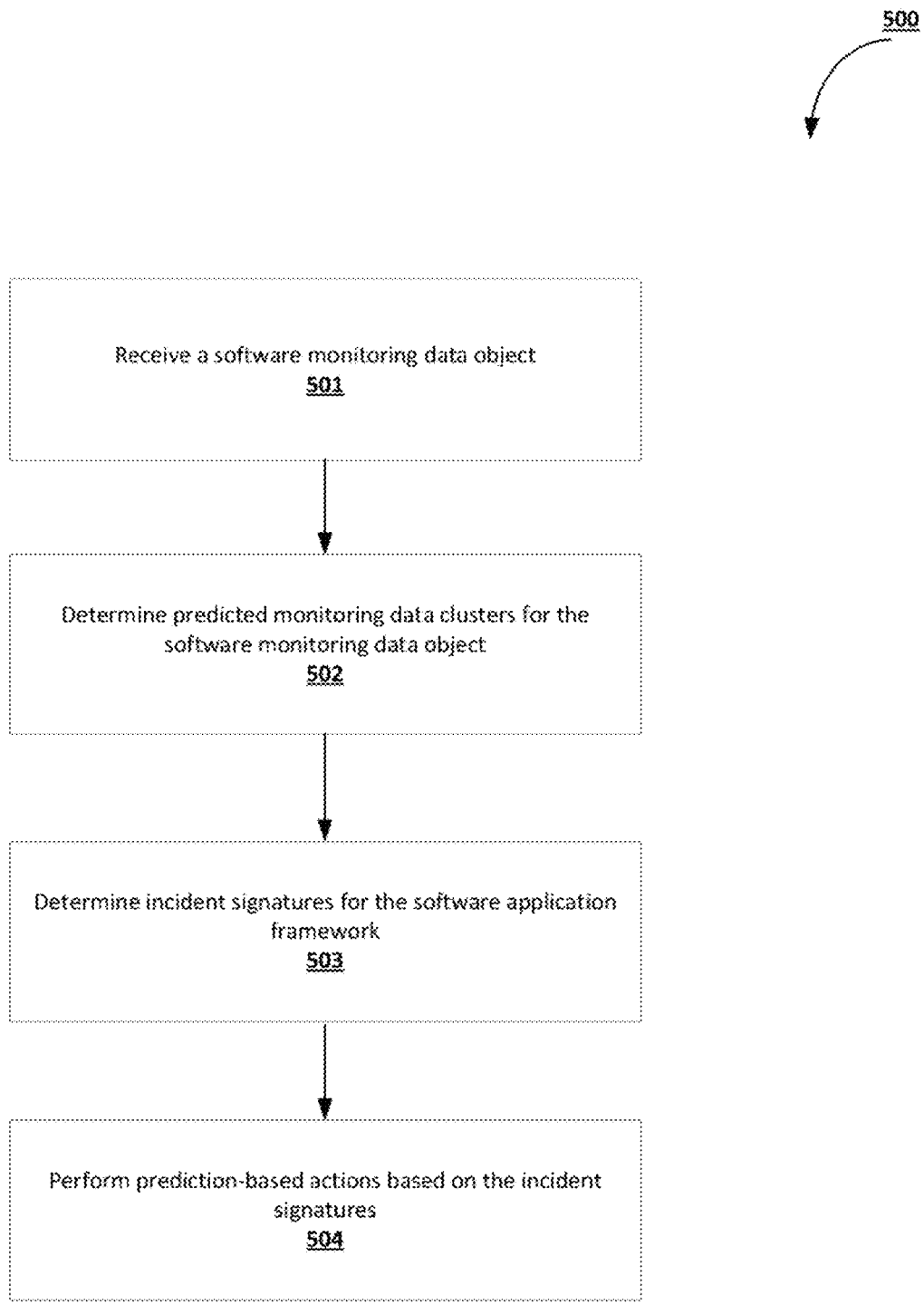
FIG. 5 is a flowchart diagram of an example process for predictive monitoring of a software application framework in accordance with at least some embodiments of the present invention.

FIG. 5 is a flowchart diagram of an example process 500 for predictive monitoring of a software application framework. Via the various operations of the process 500, the software monitoring data management computing device 106 can utilize a machine learning framework to efficiently and reliably generate incident signatures for the software application framework based on clusters of monitoring data objects associated with the software application framework.

The process 500 begins at operation 501 when the software monitoring data management computing device 106 identifies a software monitoring data object for the software application framework. For example, the software monitoring data management computing device 106 may receive the software monitoring data management computing device 106 from one of the software application monitoring computing devices 103. An example of a software monitoring computing device is a data object that describes a recorded/monitored software incident alert for a software incident associated with the software application framework.

The software monitoring data object is configured to describe one or more execution properties associated with execution of the software application framework being monitored by a software application monitoring computing device 103 during a maintenance-critical state (e.g., a software failure state) of the software application framework. In some embodiments, a software monitoring data object may describe that a failure of a particular software application of a multi-application software application framework has been recorded at a particular time.

For example, the software monitoring data object may describe that the software application framework has been recorded to have experienced a network outage. As another example, the software monitoring data object may describe that the software application framework has been recorded to have experienced a processor saturation. As yet another example, the software monitoring data object may describe that the software application framework has been recorded to have experienced a process crash.

FIG. 6 depicts an operational example of a software monitoring data display user interface 600 that includes user interface segments 611-615 that each describe various properties of a corresponding software monitoring data object. As further depicted in FIG. 6, because of the selection of the user interface element 601, the software monitoring data display user interface 600 currently displays information about "open" (i.e., unresolved) software monitoring data objects. User interface segments 611-615 are described in greater detail below, in relation to describing exemplary data fields of a software monitoring data object.

The software monitoring data object may describe one or more data fields that describe one or more execution properties of a monitored event associated with the software application framework. For example, the software monitoring data object may include one or more natural language data fields that describe the above-noted execution properties using unstructured natural language data as well as one or more structured data fields that describe the execution properties using structured data, such as key-value pairs. Examples of software monitoring data objects include software incident alert data objects. Examples of natural language data fields of a software monitoring data object include a message data field of the software monitoring data object, such as the message field of a software monitoring data object in the Opsgenie® incident management platform. Examples of structured data fields of a software monitoring data object include a monitoring data object count for the software monitoring data object, an acknowledgement status for the software monitoring data object, a generation timestamp for the software monitoring data object, a monitoring data priority score for the software monitoring data object, and a visibility status for the software monitoring data object.

A natural language data field of a software monitoring data object describes execution properties of a monitored event associated with the software monitoring data object as unstructured data. For example, as depicted in FIG. 6, the natural language data field of the user interface segment 611 describes that the corresponding software monitoring data object is associated with the natural language data "APPLICATION Problem 979: Web check global outage"; the natural language data field of the user interface segment 612 describes that the corresponding software monitoring data object is associated with the natural language data "OPEN Problem 646: Process crashed"; the natural language data field of the user interface segment 613 describes that the corresponding software monitoring data object is associated with the natural language data "OPEN Problem 534: Process crashed"; the natural language data field of the user interface segment 614 describes that the corresponding software monitoring data object is associated with the natural language data "OPEN Problem 186: CPU saturation"; and the natural language data field of the user interface segment 615 describes that the corresponding software monitoring data object is associated with the natural language data "OPEN Problem 814: Process crashed".

A structured data field of a software monitoring data object describe execution properties of a monitored event associated with the software monitoring data object as structured data, such as a key-value pairs. Examples of structured data fields for a software monitoring data object include a monitoring data object count for the software monitoring data object, a generation timestamp for the software monitoring data object, an update timestamp for the software monitoring data object, a monitoring data priority score for the software monitoring data object, a view status for the software monitoring data object, an acknowledgement status for the software monitoring data object, and a resolution status for the software monitoring data object.

The monitoring data object count for a software monitoring data object describes a count of software monitoring data objects that are deemed to be associated with a common monitored event for the corresponding software monitoring data object. In some embodiments, a software application monitoring computing device 103 that transmits software monitoring data objects to the software monitoring data management computing device 106 performs an initial grouping of the transmitted software monitoring data objects. In some of those embodiments, the monitoring object data count for a software monitoring data object describes a count of the software monitoring data objects that are within the initial grouping of the corresponding software monitoring data object. An example of an monitoring data object count field is the count field of the software monitoring data objects in the Opsgenie® incident management platform.

The monitoring data priority score for a software monitoring data object describes an assigned relative urgency level for the corresponding software monitoring data object.

In some embodiments, a software application monitoring computing device 103 that transmits software monitoring data objects to the software monitoring data management computing device 106 performs an initial priority scoring of the transmitted software monitoring data objects, which are then used to generate the monitoring data priority scores for the software monitoring data objects. An example of a monitoring data priority score is the priority field of the software monitoring data objects in the Opsgenie® incident management platform.

The generation timestamp for a software monitoring data object describes when the corresponding software monitoring data object was first generated by the software application monitoring computing device 103. For example, as depicted in FIG. 6, the user interface segment 611 describes that the corresponding software monitoring data object is associated with a generation timestamp of Apr. 29, 2016 at 8:08 AM; the user interface segment 612 describes that the corresponding software monitoring data object is associated with a generation timestamp of Apr. 16, 2016 at 4:30 PM; the user interface segment 613 describes that the corresponding software monitoring data object is associated with a generation timestamp of Apr. 15, 2016 at 10:03 PM; the user interface segment 614 describes that the corresponding software monitoring data object is associated with a generation timestamp of Apr. 14, 2016 at 1:54 PM; and the user interface segment 615 describes that the corresponding software monitoring data object is associated with a generation timestamp of Apr. 14, 2016 at 12:32 PM. An example of a generation timestamp is the CreatedAt field of the software monitoring data objects in the Opsgenie® incident management platform.

The update timestamp for a software monitoring data object describes when the corresponding software monitoring data object was last updated by a software application monitoring computing device 103. In some embodiments, the software monitoring data management computing device 106 enables a software application monitoring computing device 103 to update the data fields of a software monitoring data object after initially transmitting the software monitoring data object. In some of the noted embodiments, the software monitoring data management computing device 106 records the latest update timestamp for a software monitoring data object as a structured data field of the software monitoring data object. An example of an update timestamp is the UpdatedAt field of the software monitoring data objects in the Opsgenie® incident management platform.

The view status for a software monitoring data object describes whether the corresponding software monitoring data object has been viewed by an administrator user profile of the software application monitoring computing device 103. In some embodiments, the view status for a software monitoring data object is generated based on tracking the user activity data of an administrator user profile, which may for example be performed by at least one of a software application monitoring computing device 103 and the software monitoring data management computing device 106. An example of a view status is the isSeen field of the software monitoring data objects in the Opsgenie® incident management platform.

The acknowledgement status for the software monitoring data object describes whether the corresponding software monitoring data object has been acknowledged by an administrator user profile of the software application monitoring computing device 103. For example, as depicted in FIG. 6, the user interface segment 611 describes that the corresponding software monitoring data object has a negative acknowledgement status describing a lack of acknowledgement of the corresponding software monitoring data object, the user interface segment 612 describes that the corresponding software monitoring data object has a negative acknowledgement status describing a lack of acknowledgement of the corresponding software monitoring data object, the user interface segment 613 describes that the corresponding software monitoring data object has a negative acknowledgement status describing a lack of acknowledgement of the corresponding software monitoring data object, the user interface segment 614 describes that the corresponding software monitoring data object has a negative acknowledgement status describing a lack of acknowledgement of the corresponding software monitoring data object, and the user interface segment 615 describes that the corresponding software monitoring data object has a negative acknowledgement status describing a lack of acknowledgement of the corresponding software monitoring data object. An example of an acknowledgement status is the isAcknowledged field of the software monitoring data objects in the Opsgenie® incident management platform.

The resolution status of a corresponding software monitoring data object describes whether the corresponding software monitoring data object has been resolved by an administrator user profile. For example, as depicted in FIG. 6, the user interface segment 611 depicts that the corresponding software monitoring data object has a negative resolution status describing an open resolution status, the user interface segment 612 depicts that the corresponding software monitoring data object has a negative resolution status describing an open resolution status, the user interface segment 613 depicts that the corresponding software monitoring data object has a negative resolution status describing an open resolution status, the user interface segment 614 depicts that the corresponding software monitoring data object has a negative resolution status describing an open resolution status, and the user interface segment 615 depicts that the corresponding software monitoring data object has a negative resolution status describing an open resolution status.

In some embodiments, the one or more structured data fields for a software monitoring data object include a window-adjusted timestamp for the software monitoring data object, where the window-adjusted timestamp is determined based on a sliding window for the software monitoring data object, and the sliding window comprises a predefined number of temporally adjacent software monitoring data objects for the software monitoring data object. The window-adjusted timestamp for the software monitoring data object may be generated by the software monitoring data management computing device 106 by adjusting the update timestamp of a corresponding software monitoring data object based on a statistical distribution measure of the generation timestamps of the software monitoring data objects that fall within a sliding window of the corresponding software monitoring data object. In some embodiments, by processing temporally adjacent software monitoring data objects for a particular software monitoring data object, the software monitoring data management computing device 106 learns patterns or the sequence of software monitoring data objects. For example, with respect to database-outage-related alerts, the software monitoring data management computing device 106 may learn where such alerts usually originate from, where they are propagated, and which software applications and/or software application services of a software application framework are usually affected by incidences related to those alerts.

For example, in some embodiments, the software monitoring data management computing device 106 may generate a window-adjusted timestamp for a corresponding software monitoring data object by: (i) identifying a predefined number of (e.g., five) software monitoring data objects that occur within a sliding window of the corresponding software monitoring data object (e.g., a sliding window that includes the corresponding software monitoring data object, two software monitoring data objects whose generation timestamps immediately precede the generation timestamp of the corresponding software monitoring data object, and two software monitoring data objects whose generation timestamps immediately succeed the generation timestamp of the corresponding software monitoring data object), (ii) calculating the mean of the update timestamps of the five software monitoring data objects, and (iii) generating the window-adjusted timestamp based on the calculated mean.

As another example, in some embodiments, the software monitoring data management computing device 106 may generate a window-adjusted timestamp for a corresponding software monitoring data object by: (i) identifying a predefined number of (e.g., five) software monitoring data objects that occur within a sliding window of the corresponding software monitoring data object, (ii) calculating the median of the update timestamps of the five software monitoring data objects, and (iii) generating the window-adjusted timestamp based on the calculated median.

An operational example of a software monitoring data object 701 is depicted in FIG. 7. As depicted in FIG. 7, the software monitoring data object 701 is associated with the acknowledgement status 711, the view status 712, the monitoring data object count 713, the monitoring data priority score 714, the natural language data field 715, the object identifier 716, the owner identifier 717, the team identifier 718, the alias 719, the generation timestamp 720, the update timestamp 721, the resolution status 722, the last occurrence timestamp 723, the snooze timestamp 724, and the snooze status 725.

Returning to FIG. 5, at operation 502, the software monitoring data management computing device 106 determines one or more predicted monitoring data clusters for the software monitoring data object. In some embodiments, to determine the predicted monitoring data clusters for the software monitoring data object, the software monitoring data management computing device 106 first determines, based on one or more natural language data fields of a software monitoring data object for the software application framework and using a natural language processing machine learning framework, a natural language feature data object for the software monitoring data object. Afterward, the software monitoring data management computing device 106 determines, based on one or more structured data fields of the software monitoring data object and using a structured data processing machine learning model, a structured data feature data object for the software monitoring data object. Thereafter, the software monitoring data management computing device 106 determines, based on the natural language feature data object and the structured data feature data object and using a feature combination machine learning model, a monitoring data representation for the software monitoring data object. Finally, the software monitoring data management computing device 106 determines, based on the monitoring data representation and using a clustering machine learning model, one or more predicted monitoring data clusters for the software monitoring data object.

A predicted monitoring data cluster is generated by the software monitoring data management computing device 106 through processing the monitoring data representation for a software monitoring data object along with one or more other monitoring data representations for one or more other software monitoring data objects using a clustering machine learning model. The clustering machine learning model is configured to generate one or more monitoring data clusters based on distance measures between pairs of monitoring data representations in a multi-dimensional space associated with the clustering machine learning model, where each monitoring data cluster includes a group of software monitoring data objects whose respective monitoring data representation mappings in the multi-dimensional space are deemed sufficiently proximate. The predicted monitoring data clusters for a particular software monitoring data object include a selected subset of the one or more monitoring data clusters determined by the clustering machine learning model, where each monitoring data cluster in the selected cluster includes the particular software monitoring data object.

In some embodiments, operation 502 may be performed in accordance with the process that is depicted in FIG. 8. The process that is depicted in FIG. 8 begins at operation 801 when the software monitoring data management computing device 106 determines, based on one or more natural language data fields of the software monitoring data object and using a natural language processing machine learning framework, a natural language feature data object for the software monitoring data object. For example, the software monitoring data management computing device 106 may process the message field of a software monitoring data object using a sentence encoder machine learning model to generate a natural language embedding of the software monitoring data object.

The natural language processing machine learning framework is configured to process natural language data fields of a software monitoring data object (e.g., a message field of the software monitoring data object) in order to generate a natural language feature data object for the software monitoring data object. While various embodiments of the present invention describe architectures in which the natural language processing operations of the natural language processing machine learning framework are executed locally on the software monitoring data management computing device, a person of ordinary skill in the relevant technology will recognize that, in some embodiments, the natural language processing operations of the natural language processing machine learning framework may be executed on a natural language processing server computing device that is remote from the software monitoring data management computing device.

For example, in some embodiments, the operations of the natural language processing machine learning framework may cause the software monitoring data management computing device to transmit one or more application programming interface (API) calls to the natural language processing server computing device in order to cause the natural language processing server computing device to generate the natural language feature data object by performing one or more natural language processing operations on the natural language data fields of a software monitoring data object and transmit the natural language feature data object to the software monitoring data management computing device in response to the API calls. Examples of natural language processing machine learning frameworks include the Google Universal Sentence Encoder, a Bidirectional Encoder Representations from Transformers (BERT)-based model, an encoder-decoder-based natural language processing model, and/or the like.

Accordingly, the natural language feature embedding is generated by software monitoring data management computing device 106 through processing natural language data fields of a software monitoring data object using a natural language processing machine learning framework. In some embodiments, the natural language feature data object describes an n-dimensional vector, where the n value may be supplied as a hyper-parameter of the natural language processing machine learning framework. In some embodiments, the number and types of dimensions of the natural language feature data object is defined in accordance with a feature space, where the feature space may also characterize the number and types of dimensions of a structured data feature data object. An example of a natural language feature data object is the output of processing the message field of a software monitoring data object in the Opsgenie® incident management platform using a Google Universal Sentence Encoder model.

At operation 802, the software monitoring data management computing device 106 determines, based on one or more structured data fields of the software monitoring data object and using a structured data processing machine learning model, a structured data feature data object for the software monitoring data object. For example, the software monitoring data management computing device 106 may process the generation timestamp, the acknowledgement status, and the monitoring data object count of a software monitoring data object using a machine learning model to generate a structured data embedding of the noted structured data features of the software monitoring data object.

The structured data processing machine learning model is configured to process structured data fields of a software monitoring data object in order to generate a structured data feature data object for the software monitoring data object. While various embodiments of the present invention describe architectures in which the structured data processing operations of the structured data processing machine learning model are executed locally on the software monitoring data management computing device, a person of ordinary skill in the relevant technology will recognize that, in some embodiments, the structured data processing operations of the structured data processing machine learning model may be executed on a structured data processing server computing device that is remote from the software monitoring data management computing device.

For example, in some embodiments, the operations of the structured data processing machine learning model may cause the software monitoring data management computing device to transmit one or more API calls to the structured data processing server computing device in order to cause the structured data processing server computing device to generate the structured data feature data object by performing one or more structured data processing operations on the structured data fields of a software monitoring data object and transmit the structured data feature data object to the software monitoring data management computing device in response to the API calls. Examples of structured data processing machine learning models include a feedforward fully-connected neural network model, a recurrent neural network model, an adversarial neural network model, and/or the like.

Accordingly, the structured data feature data object is generated by the software monitoring data management computing device 106 through processing structured data fields of a software monitoring data object using a structured data processing machine learning model. In some embodiments, the structured data feature data object describes an n-dimensional vector, where the n value may be supplied as a hyper-parameter of the structured data processing machine learning model. In some embodiments, the number and types of dimensions of the structured data feature data object is defined in accordance with a feature space, where the feature space may also characterize the number and types of dimensions of a natural language feature data object. An example of a structured data feature data object is the output of processing the timestamp field of a software monitoring data object in the Opsgenie® incident management platform using a feedforward fully-connected neural network model.

At operation 803, the software monitoring data management computing device 106 determines, based on the natural language feature data object and the structured data feature data object and using a feature combination machine learning model, a monitoring data representation for the software monitoring data object. For example, the software monitoring data management computing device 106 may process the natural language feature data object and the structured data feature data object using a dual-input machine learning model to generate the monitoring data representation for the software monitoring data object. As another example, when the natural language feature data object and the structured data feature data object have the same dimension, the software monitoring data management computing device 106 may sum up the natural language feature data object and the structured data feature data object to generate the monitoring data representation for the software monitoring data object.

The feature combination machine learning model is configured to process the natural language feature data object for a software monitoring data object and the structured data feature data object for the software monitoring data object in order to generate an monitoring data representation for the software monitoring data object. For example, the feature combination machine learning model may be configured to process the natural language feature data object for a software monitoring data object and the structured data feature data object for the software monitoring data object based on one or more trained parameters of the feature combination machine learning model in order to generate the monitoring data representation for the software monitoring data object. As another example, when the natural language feature data object for a software monitoring data object and the structured data feature data object for the software monitoring data object are both characterized by a common dimensionality and/or by a common feature space, the operations of the feature combination machine learning model may include performing one or more binary operations on the natural language feature data object and the structured data feature data object in order to generate the monitoring data representation based on the output of the one or more binary operations.

Accordingly, the monitoring data representation is generated by the software monitoring data management computing device 106 through processing the natural language feature data object for a software monitoring data object and the structured data feature data object for the software monitoring data object using a feature combination machine learning model. The monitoring data representation for a software monitoring data object is processed by a clustering machine learning model by mapping the monitoring data representation to a multi-dimensional space that describes mappings of one or more other monitoring data representations of one or more other software monitoring data objects. The monitoring data representation mappings described by the multi-dimensional space may then processed by the clustering machine learning model in accordance with one or more clustering algorithms in order to generate one or more monitoring data clusters for the software monitoring data object. Examples of clustering algorithms that may be utilized by the clustering machine learning model include ordering points to identify the clustering structure (OPTICS), density-based spatial clustering of applications with noise (DBSCAN), K-Nearest Neighbor, K-Means, and/or the like.

At operation 804, the software monitoring data management computing device 106 determines, based on the monitoring data representation and using a clustering machine learning model, one or more predicted monitoring data clusters for the software monitoring data object. For example, the software monitoring data management computing device 106 may map the monitoring data representation for the software monitoring data object to a multi-dimensional space that describes mappings of one or more other monitoring data representations of one or more other software monitoring data objects. The multi-dimensional space may be associated with the same feature space as the feature space of the structured data feature data object and/or the feature space of natural language feature data object, or may have a reduced dimension size relative to the dimension size of the feature space of the structured data feature data object and/or the feature space of natural language feature data object (for example, a dimensionality reduction operation may be performed on a group of monitoring data representations before mapping them to the multi-dimensional space). After mapping the monitoring data representation to a multi-dimensional space that describes mappings of one or more other monitoring data representations of one or more other software monitoring data objects, the clustering machine learning model generates one or more mapping clusters, and determines the predicted monitoring data clusters for the software monitoring data object to include each mapping cluster that includes the mapping of the software monitoring data object.

The feature combination machine learning model is configured to process the natural language feature data object for a software monitoring data object and the structured data feature data object for the software monitoring data object in order to generate an monitoring data representation for the software monitoring data object. For example, the feature combination machine learning model may be configured to process the natural language feature data object for a software monitoring data object and the structured data feature data object for the software monitoring data object based on one or more trained parameters of the feature combination machine learning model in order to generate the monitoring data representation for the software monitoring data object. As another example, when the natural language feature data object for a software monitoring data object and the structured data feature data object for the software monitoring data object are both characterized by a common dimensionality and/or by a common feature space, the operations of the feature combination machine learning model may include performing one or more binary operations on the natural language feature data object and the structured data feature data object in order to generate the monitoring data representation based on the output of the one or more binary operations.

An operational example of a multi-dimensional space 900 that is used to generate one or more monitoring data clusters is depicted in FIG. 9. As depicted in FIG. 9, the multi-dimensional space is associated with two dimensions 901 and 902. As further depicted in FIG. 9, the multi-dimensional space includes two detected monitoring data clusters: the monitoring data cluster 921 that includes the software monitoring data object 911, the software monitoring data object 913, and the software monitoring data object 915; as well as the monitoring data cluster 922 that includes the software monitoring data object 912, the software monitoring data object 914, and the software monitoring data object 916.

Returning to FIG. 5, at operation 503, the software monitoring data management computing device 106 determines one or more incident signatures for the software application framework based on the one or more predicted monitoring data clusters. For example, an incident signature for the software application framework may describe the one or more predicted monitoring data clusters and/or one or more inferred properties for each of the one or more predicted monitoring data clusters, where an inferred property for a predicted monitoring data cluster may describe a common property of all of the software monitoring data objects that are associated with the noted predicted monitoring data cluster. In some embodiments, the incident signature describes a software application that is affected by the software monitoring data objects in a predicted monitoring data cluster. In some embodiments, the incident signature describes a software service that is affected by the software monitoring data objects in a predicted monitoring data cluster. In some embodiments, the incident signature describes a feature of a software application and/or a software service that is affected by the software monitoring data objects in a predicted monitoring data cluster.

The incident signature for a software application framework software platform describes one or more inferred properties about an inferred cross-platform failure of the software application framework, where the one or more inferred properties are determined based on a monitoring data cluster that is identified by the software monitoring data management computing device. For example, in response to a monitoring data cluster that describes a group of data retrieval failures, the software monitoring data management computing device may generate an incident signature that describes the software monitoring data objects in the monitoring data cluster and/or describes that the software application framework is experiencing a database failure. As another example, in response to a monitoring data cluster that describes a group of network transmissions failures, the software monitoring data management computing device may generate an incident signature that describes the software monitoring data objects in the monitoring data cluster and/or describes that the software application framework is experiencing a network connection failure. An operational example of an incident signature 700 is depicted in FIG. 7. As depicted in FIG. 7, the incident signature describes a group of software monitoring data objects associated with the incident signature as well as one or more inferred properties 702 of the incident signature.

At operation 504, the software monitoring data management computing device 106 performs one or more prediction-based actions based on the one or more incident signatures. For example, performing the one or more prediction-based actions may include enabling display of a prediction output user interface that displays the one or more incident signatures. As another example, performing the one or more prediction-based actions may include enabling display of a prediction output user interface that is configured to receive one or more user feedback data objects for the one or more predicted monitoring data clusters, where at least one of the natural language processing machine learning framework, the structured data processing machine learning model, and the feature combination machine learning model is retrained using the one or more user feedback data objects. As yet another example, performing the one or more prediction-based actions may include enabling display of a prediction output user interface that is configured to display a ranking of the one or more predicted monitoring data clusters in accordance with the one or more cluster priority scores, where the cluster priority score for a predicted monitoring data cluster may be determined by combining each monitoring data priority score for a monitoring data object that is in the predicted monitoring data cluster. As a further example, performing the one or more prediction-based actions may include performing one or more automated system maintenance operations for the software application framework in accordance with the incident signatures. In some embodiments, an incident manager generates an incident review data object after filing a software incident. In some of those embodiments, the incident review data object is used to retrain the natural language processing machine learning framework. In some embodiments, the natural language processing machine learning framework is used to recommend incident review data objects and/or incident runbooks in the future, a feature that in turn leads to faster referencing and resolution of incidents.

Other examples of prediction-based actions that may be performed by the software monitoring data management computing device 106 include: (i) ranking of the predicted monitoring data clusters (e.g., based on count of software monitoring data objects associated with the predicted monitoring data clusters, timestamps of software monitoring data objects associated with the predicted monitoring data clusters, relevance of software monitoring data objects associated with the predicted monitoring data clusters to a user, and/or the like) before presenting the predicted monitoring data clusters, (ii) re-ranking of the predicted monitoring data clusters (e.g., based on user feedback and/or any incoming software monitoring data objects associated with the predicted monitoring data clusters), (iii) cluster pruning (e.g., by removing noisy or less relevant software monitoring data objects from predicted monitoring data clusters), and (iv) cluster merging (e.g., by merging two or more predicted monitoring data clusters that may have occurred in different timestamps but may otherwise be associated with a common incident signature and/or with similar incident signatures).

An operational example of a prediction output user interface 1000 is depicted in FIG. 10. As depicted in FIG. 10, the prediction output user interface 1000 depicts an incident signature that describes five monitoring data objects 1001 along with inferred temporal progression data 1002 (which is an example of inferred properties of an incident signature) for the five monitoring data objects. The five monitoring data objects 1001 described by the corresponding incident signature belong to a common predicted monitoring data cluster. Moreover, the prediction output user interface 1000 describes, for each of the five monitoring data objects 1001, an alias, a generation timestamp, a natural language data field, a view status, an acknowledgement status, and a monitoring data priority score.

As further depicted in FIG. 10, the prediction output user interface enables, via a right-click interaction with a software monitoring data object and presentation of a software monitoring linking user interface element such as the software monitoring user interface element 1011, linking/associating of a software monitoring data object to a different predicted monitoring data cluster, as well as unlinking/disassociating a software monitoring data object from a current predicted monitoring data cluster. As further depicted in FIG. 10, the prediction output user interface enables, via user interface element 1012, unlinking/disassociating a current predicted monitoring data cluster from a predicted incident signature. As further depicted in FIG. 10, the prediction output user interface enables, via user interface element 1013, linking/associating a current predicted monitoring data cluster to a predicted incident signature. As further depicted in FIG. 10, the prediction output user interface enables, via user interface element 1014, deleting a current monitoring data cluster.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for predictive monitoring of a software application framework, the apparatus comprising at least one processor and at least one non-transitory memory comprising program code, the at least one non-transitory memory and the program code configured to, with the at least one processor, cause the apparatus to at least:
    determine, based on one or more natural language data fields of a software monitoring data object for the software application framework and using a natural language processing machine learning framework, a natural language feature data object for the software monitoring data object;
    determine, based on one or more structured data fields of the software monitoring data object and using a structured data processing machine learning model, a structured data feature data object for the software monitoring data object;
    determine, based on the natural language feature data object and the structured data feature data object and using a feature combination machine learning model, a monitoring data representation for the software monitoring data object;
    determine, based on the monitoring data representation and using a clustering machine learning model, one or more predicted monitoring data clusters for the software monitoring data object;
    determine, based on the one or more predicted monitoring data clusters, one or more incident signatures for the software application framework; and
    cause output of a prediction output user interface comprising the one or more incident signatures for the software application framework, wherein the one or more incident signatures are positioned in association with the one or more predicted monitoring data clusters for the software monitoring data object.

2. The apparatus of claim 1, wherein the natural language feature data object and the structured data feature data object are associated with a common feature space.

3. The apparatus of claim 1, wherein the one or more natural language data fields comprise an incident message for the software monitoring data object.

4. The apparatus of claim 1, wherein the one or more structured data fields comprise a monitoring data object count for the software monitoring data object, an acknowledgement status for the software monitoring data object, a generation timestamp for the software monitoring data object, a monitoring data priority score for the software monitoring data object, and a view status for the software monitoring data object.

5. The apparatus of claim 1, wherein:
    the one or more structured data fields comprise a window-adjusted timestamp for the software monitoring data object,
    the window-adjusted timestamp is determined based on a sliding window for the software monitoring data object, and
    the sliding window comprises a predefined number of temporally adjacent software monitoring data objects for the software monitoring data object.

6. The apparatus of claim 1, wherein:
    causing output of the prediction output user interface comprises causing rendering, to the prediction output user interface, of a software monitoring linking user interface element, wherein user engagement with the software monitoring linking user interface element is configured to selectively link or unlink the software monitoring data object to or from the one or more predicted monitoring data clusters.

7. The apparatus of claim 1, wherein:
    the software monitoring data object is associated with a monitoring data priority score,
    the one or more predicted monitoring data clusters are associated with one or more cluster priority scores, and
    the one or more cluster priority scores are determined based on the monitoring data priority score.

8. The apparatus of claim 7, wherein:
    the prediction output user interface is configured to display a ranking of the one or more predicted monitoring data clusters in accordance with the one or more cluster priority scores.

9. A computer-implemented method for predictive monitoring of a software application framework, the computer-implemented method comprising:
    determining, based on one or more natural language data fields of a software monitoring data object for the software application framework and using a natural language processing machine learning framework, a natural language feature data object for the software monitoring data object;
    determining, based on one or more structured data fields of the software monitoring data object and using a structured data processing machine learning model, a structured data feature data object for the software monitoring data object;
    determining, based on the natural language feature data object and the structured data feature data object and using a feature combination machine learning model, a monitoring data representation for the software monitoring data object;
    determining, based on the monitoring data representation and using a clustering machine learning model, one or more predicted monitoring data clusters for the software monitoring data object;
    determining, based on the one or more predicted monitoring data clusters, one or more incident signatures for the software application framework; and
    causing output of a prediction output user interface comprising the one or more incident signatures for the software application framework, wherein the one or more incident signatures are positioned in association with the one or more predicted monitoring data clusters for the software monitoring data object.

10. The computer-implemented method of claim 9, wherein the natural language feature data object and the structured data feature data object are associated with a common feature space.

11. The computer-implemented method of claim 9, wherein the one or more natural language data fields comprise an incident message for the software monitoring data object.

12. The computer-implemented method of claim 9, wherein the one or more structured data fields comprise a monitoring data object count for the software monitoring data object, an acknowledgement status for the software monitoring data object, a generation timestamp for the software monitoring data object, a monitoring data priority score for the software monitoring data object, and a view status for the software monitoring data object.

13. The computer-implemented method of claim 9, wherein:
the one or more structured data fields comprise a window-adjusted timestamp for the software monitoring data object,
the window-adjusted timestamp is determined based on a sliding window for the software monitoring data object, and
the sliding window comprises a predefined number of temporally adjacent software monitoring data objects for the software monitoring data object.

14. The computer-implemented method of claim 9, wherein:
causing output of the prediction output user interface comprises causing rendering, to the prediction output user interface, of a software monitoring linking user interface element, wherein user engagement with the software monitoring linking user interface element is configured to selectively link or unlink the software monitoring data object to or from the one or more predicted monitoring data clusters.

15. The computer-implemented method of claim 9, wherein:
the software monitoring data object is associated with a monitoring data priority score,
the one or more predicted monitoring data clusters are associated with one or more cluster priority scores, and
the one or more cluster priority scores are determined based on the monitoring data priority score.

16. A computer program product for predictive monitoring of a software application framework, the computer program product comprising at least one non-transitory computer-readable storage medium having computer-readable program code portions stored therein, the computer-readable program code portions configured to:
determine, based on one or more natural language data fields of a software monitoring data object for the software application framework and using a natural language processing machine learning framework, a natural language feature data object for the software monitoring data object;
determine, based on one or more structured data fields of the software monitoring data object and using a structured data processing machine learning model, a structured data feature data object for the software monitoring data object;
determine, based on the natural language feature data object and the structured data feature data object and using a feature combination machine learning model, a monitoring data representation for the software monitoring data object;
determine, based on the monitoring data representation and using a clustering machine learning model, one or more predicted monitoring data clusters for the software monitoring data object;
determine, based on the one or more predicted monitoring data clusters, one or more incident signatures for the software application framework; and
cause output of a prediction output user interface comprising the one or more incident signatures for the software application framework, wherein the one or more incident signatures are positioned in association with the one or more predicted monitoring data clusters for the software monitoring data object.

17. The computer program product of claim 16, wherein the natural language feature data object and the structured data feature data object are associated with a common feature space.

18. The computer program product of claim 16, wherein the one or more natural language data fields comprise an incident message for the software monitoring data object.

19. The computer program product of claim 16, wherein the one or more structured data fields comprise a monitoring data object count for the software monitoring data object, an acknowledgement status for the software monitoring data object, a generation timestamp for the software monitoring data object, a monitoring data priority score for the software monitoring data object, and a view status for the software monitoring data object.

20. The computer program product of claim 16, wherein:
the one or more structured data fields comprise a window-adjusted timestamp for the software monitoring data object,
the window-adjusted timestamp is determined based on a sliding window for the software monitoring data object, and
the sliding window comprises a predefined number of temporally adjacent software monitoring data objects for the software monitoring data object.

* * * * *